United States Patent
Bowman et al.

(10) Patent No.: US 6,815,102 B2
(45) Date of Patent: Nov. 9, 2004

(54) ENERGY MANAGEMENT SYSTEM FOR A ROTARY MACHINE AND METHOD THEREFOR

(75) Inventors: Michael John Bowman, Niskayuna, NY (US); Gautam (NMN) Sinha, Clifton Park, NY (US); Karl Edward Sheldon, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 89 days.

(21) Appl. No.: 10/064,134

(22) Filed: Jun. 13, 2002

(65) Prior Publication Data

US 2004/0191596 A1 Sep. 30, 2004

(51) Int. Cl.[7] .................................................. H01M 8/04
(52) U.S. Cl. ............................ 429/13; 429/24; 429/26; 429/34; 165/104.33
(58) Field of Search ................................ 429/13, 22, 23, 429/29, 25, 26, 39, 35, 36, 37, 38; 165/104.33

(56) References Cited

U.S. PATENT DOCUMENTS

| 5,086,718 A | * | 2/1992 | Asakawa ............ 165/104.33 X |
| 5,701,751 A | * | 12/1997 | Flores ............... 165/104.33 X |
| 6,101,715 A | * | 8/2000 | Fuesser et al. ...... 165/104.33 X |
| 6,281,596 B1 | | 8/2001 | Gilbreth et al. ............... 290/52 |
| 6,641,946 B2 | * | 11/2003 | Basel et al. .................... 429/23 |

FOREIGN PATENT DOCUMENTS

| GB | 54-162248 | * | 12/1979 | |
| JP | 1572204 | * | 7/1980 | ............. H01B/7/18 |

* cited by examiner

Primary Examiner—Stephen J. Kalafut
(74) Attorney, Agent, or Firm—Ann M. Agosti; Patrick K. Patnode

(57) ABSTRACT

In energy management system is provided for a power generating device having a working fluid intake in which the energy management system comprises an electrical dissipation device coupled to the power generating device and a dissipation device cooling system configured to direct a portion of a working fluid to the electrical dissipation device so as to provide thermal control to the electrical dissipation device.

22 Claims, 4 Drawing Sheets

ENERGY MANAGEMENT SYSTEM FOR A ROTARY MACHINE AND METHOD THEREFOR

FEDERAL RESEARCH STATEMENT

The U.S. Government may have certain rights in this invention pursuant to contract number DEFC0200CH11063 awarded by the Department of Energy (DOE).

BACKGROUND OF THE INVENTION

The present invention relates generally to rotary machines, and more particularly to an energy management system for rotary machines.

Rotary machines include, without limitation, turbines for steam turbines, compressors and turbines for gas turbines and turbines for hybrid fuel cells. A steam turbine has a steam path that typically includes, in serial-flow relationship, a steam inlet, a steam generating device, a turbine and a steam outlet. A gas turbine has a gas path that typically includes, in serial-flow relationship, an air intake (also known as an inlet), a compressor, a combustor, a turbine, and a gas outlet. A hybrid fuel cell has a gas path that typically includes, in serial-flow relationship, an air intake, a compressor, a fuel cell, a turbine and a gas outlet. In the abovementioned turbines, the gases (steam or gas) flow to a turbine that extracts energy for driving a turbine shaft to produce output power for powering an electrical generator. A turbine is typically operated for extended periods of time at a relatively high base load for powering the electrical generator to produce electrical power in a utility grid, for example. In some cases, the rotary machine is subject to a grid transient or load interruption that causes the output breakers of the electrical generator to open thereby resulting in a sudden loss of load that can cause an overspeed condition. The loss of load, in addition to a response time of the rotary machine to the load interruption, may cause an acceleration effect to the rotary components and, at times, result in mechanical damage therein. Furthermore, the loss of load in the rotary machine may also damage the electrical components by providing thermal stresses therein. In cases involving turbines comprising recuperators, for example, the recuperator functions to recover heat from a turbine exhaust and stores excess that, at times, maintains the rotation and increases the acceleration of the rotary equipment in the machine when the load interruption occurs.

By way of example and not limitation, typical grid transients and load interruptions include voltage sags, voltage surges, voltage interruptions, single phase failures, phase to phase faults and phase to ground faults. Some conventional turbine designs comprise resistors disposed to receive a build-up of electrical energy in the event of such casualties. While these types of conventional designs have proved to be quite reliable, the resistors, however, are sized for worst case operating conditions (e.g. such as high ambient temperatures and no cooling sources available) and are typically overdesigned for normal operating conditions. In addition, such robust designs increase the total cost in manufacturing the rotary machine.

Accordingly, there is a need in the art for a rotary machine having improved energy management control characteristics.

SUMMARY OF INVENTION

On embodiment of the present invention comprises an energy management system for a power generating device having a working fluid intake in which the energy management system comprises an electrical dissipation device coupled to the power generating device and a dissipation device cooling system configured to direct a portion of a working fluid to the electrical dissipation device so as to provide thermal control to the electrical dissipation device.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
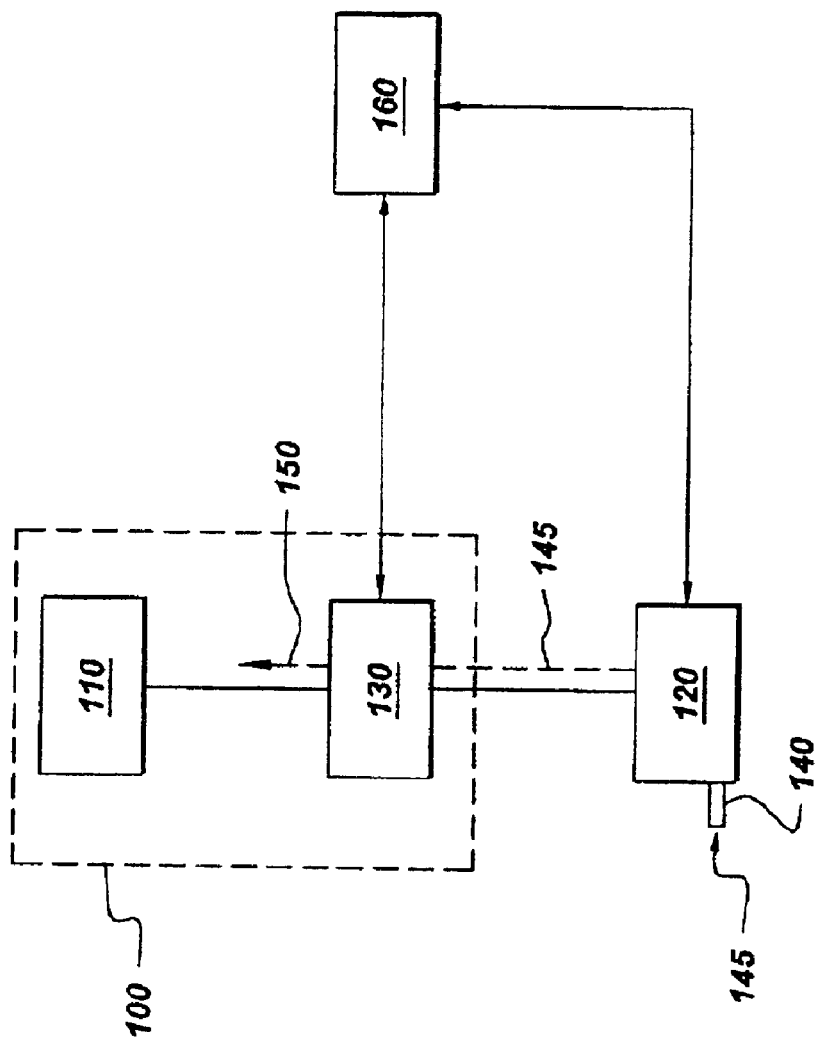
FIG. 1 is a block diagram of an energy management system in accordance with one embodiment of the present invention.

An energy management system 100 is provided for a power-generating device 120 (see FIG. 1). In one embodiment, the power generating device 120 comprises a working fluidintake 140 and the energy management system 100 comprises an (meaning at least one) electrical dissipation device 110 coupled to the power generating device 120. In an exemplary embodiment, the electrical dissipation device 110 comprises a resistor. In addition, the energy management system 100 comprises a (meaning at least one) dissipation device cooling system 130 that is configured to direct a portion of a working fluid 145 (portion of the working fluid 145 hereinafter referred to as vented working fluid 150) to the electrical dissipation device 110 so as to provide thermal control to the electrical dissipation device 110. As used herein, the term "thermal control" refers to cooling the electrical dissipation device 110 with the vented working fluid 150 channeled from the power-generating device 120. In one embodiment, the dissipation device cooling system 130 comprises a valve. The valve typically comprises a butterfly valve, globe valve and the like. As used herein, the term "working fluid 145" refers to a working fluid 145, typically air, that has been introduced in a compressor 190 (see FIGS. 2 and 4) or a steam generating device (see FIG. 3) via the working fluid intake 140. As used herein, the terms "thereon", "therein", "over", "above", "under", "on", "in" and the like are used to refer to the relative location of elements of the present invention as illustrated in the Figures and are not meant to be a limitation in any manner with respect to the orientation or operation of the present invention.

In one embodiment of the present invention, a current is directed to the electrical dissipation device 110 in response to a transient load condition presented to the power-generating device 120. As used herein, the term "transient load" refers to load interruptions in a grid 155 including, but not limited to, voltage sags, voltage surges, voltage interruptions, single phase failures, phase to phase faults, phase to ground faults and the like. In another embodiment, a current is typically directed to the electrical dissipation device 110 as a protective response to non-load related transient events, such as, a malfunction of a turbine controller (not shown) of the power-generating device 120. The power generating device 120 (see FIG. 1) is typically selected from, but not limited to, the group consisting of gas turbines 180 (see FIG. 2), microturbines (typically turbines comprising a recuperator 250), steam turbines 230 (see FIG. 3), and hybrid fuel cells 260 (see FIG. 4).

A control system 160 is coupled to the energy management system 100 and the power-generating device 120 (see FIG. 1). In an exemplary embodiment, the control system 160 is coupled to an output of a turbine generator 170 and coupled to the dissipation device cooling system 130 (see FIGS. 2–4). By way of example and not limitation, the control system 160 typically comprises a (meaning at least one) handheld digital computer, personal digital assistant computer, personal computer, workstation, mini-computer, mainframe computer, supercomputer and the like. It will be appreciated that, in other embodiments, the control system 160 typically comprises a (meaning at least one) sensor, central processing unit and actuator to perform various functions described herein.

The control system 160 is configured to determine a condition of the turbine generator 170 and, in response, direct the dissipation device cooling system 130 to provide the vented working fluid 150 to the electrical dissipation device 110. In one embodiment, the condition of the turbine generator 170 comprises any of the transient load conditions described herein. In other embodiments, the condition comprises non-load type conditions such as a speed condition of a turbine shaft 220 that is coupled to the turbine generator 170, a voltage condition of the turbine generator 170 or a frequency condition of the turbine generator 170 voltage. By way of example and not limitation, it is desirable, in one embodiment, to obtain the speed condition of the turbine shaft 220 in some turbines because the load interruption, for example, causes the output breakers of the turbine generator 170 to open thereby affecting the speed of the rotary components, such as the turbine shaft 220, and may cause damage to the components of the power generating device 120. As such, the electrical dissipation device 110 in the present invention is provided for dissipating in part a build-up of electrical energy in the power-generating device 120 and the dissipation device cooling system 130 serves to provide the thermal control to the electrical dissipation device 110.

When a load interruption occurs in the rotary machine, for example, a current is directed to the electrical dissipation device 110. As a result, the current directed to the electrical dissipation device 110 results in a generation of thermal heat therein so as to thermally stress the electrical dissipation device 110 and other components such as cables leading to a diode rectifier, for example. As such, at the direction of the control system 160, the dissipation device cooling system 130 provides the vented working fluid 150 to the electrical dissipation device 110. In an exemplary embodiment, it will be appreciated that the control system 160 directs the dissipation device cooling system 130 to provide the vented working fluid 150 to the electrical dissipation device 110 in response to any of the load or non-load conditions mentioned herein. The vented working fluid 150 provides thermal control to the electrical dissipation device 110 due to a convective heat transfer between the vented working fluid 150 and the electrical dissipation device 110. In some cases, conventional rotary machines typically comprise resistors that are overdesigned for extreme conditions, for example, high ambient temperatures (e.g. temperatures greater than 15° C.) and no cooling sources available. As such, in one exemplary embodiment of the present invention, the dissipation device cooling system 130 directs the vented working fluid 150 to the electrical dissipation device 110 so as to provide thermal control to the electrical dissipation device 110 thereby necessitating smaller resistors than the conventional designs. By way of example and not limitation, in a conventional 175 kW microturbine, the maximum temperature of a 110 kj resistor following a transient load for 2 seconds is expected to be in the range about 486° C. This temperature is higher than a typical desired resistor temperature in which such desired temperature is in the range of about 150° C. By deploying the energy management system 100 of the present invention, the temperature of the resistor is reduced due to the convective heat transfer between the vented working fluid 150 and the resistor. As a result, the same abovementioned 175 kW microturbine requires a smaller resistor, for example a 67 kJ resistor, that is lower in cost, smaller in size and has a lower thermal inertia than the 110 kJ resistor.

Figure 2:
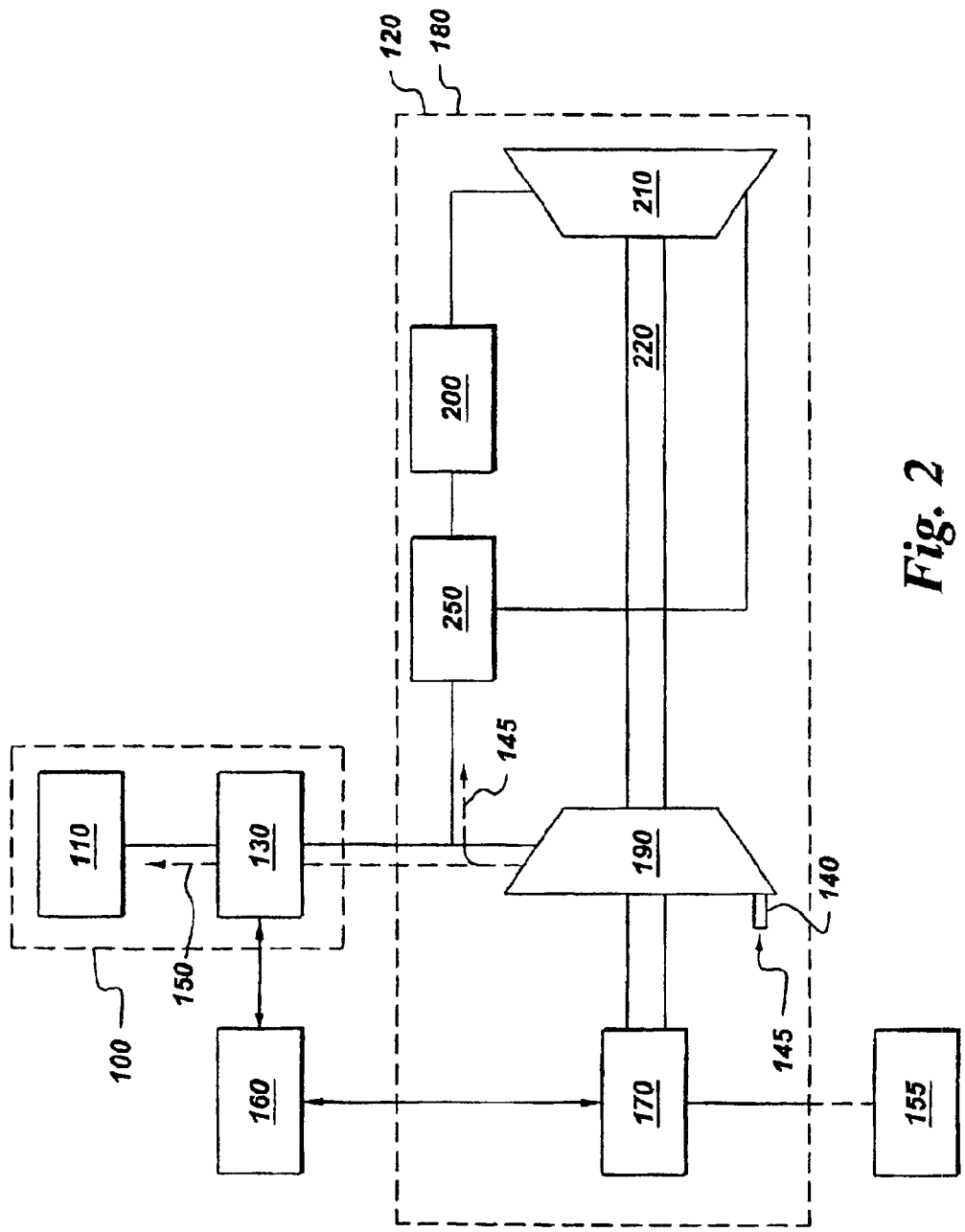
FIG. 2 is a block diagram of an energy management system for a gas turbine in accordance with another embodiment of the present invention.

In another embodiment of the present invention, the energy management system 100 is provided for the gas turbine 180 (see FIG. 2). The gas turbine 180, having a working fluid intake 140, typically comprises a compressor 190 and a combustor 200 coupled to the compressor 190. In addition, the gas turbine 180 comprises the turbine generator 170 coupled to the compressor 190, the dissipation device cooling system 130 coupled to the compressor 190 and the electrical dissipation device 110 coupled to an electrical output (not shown) of the turbine generator 170 for receiving a current therein. In another embodiment, the energy management system 100 further comprises the recuperator 250 in which a function of the recuperator 250 is to recover heat from a turbine 210 exhaust. In this embodiment, the dissipation device cooling system and the electrical dissipation device 110 include the details and operate as described herein.

Figure 3:
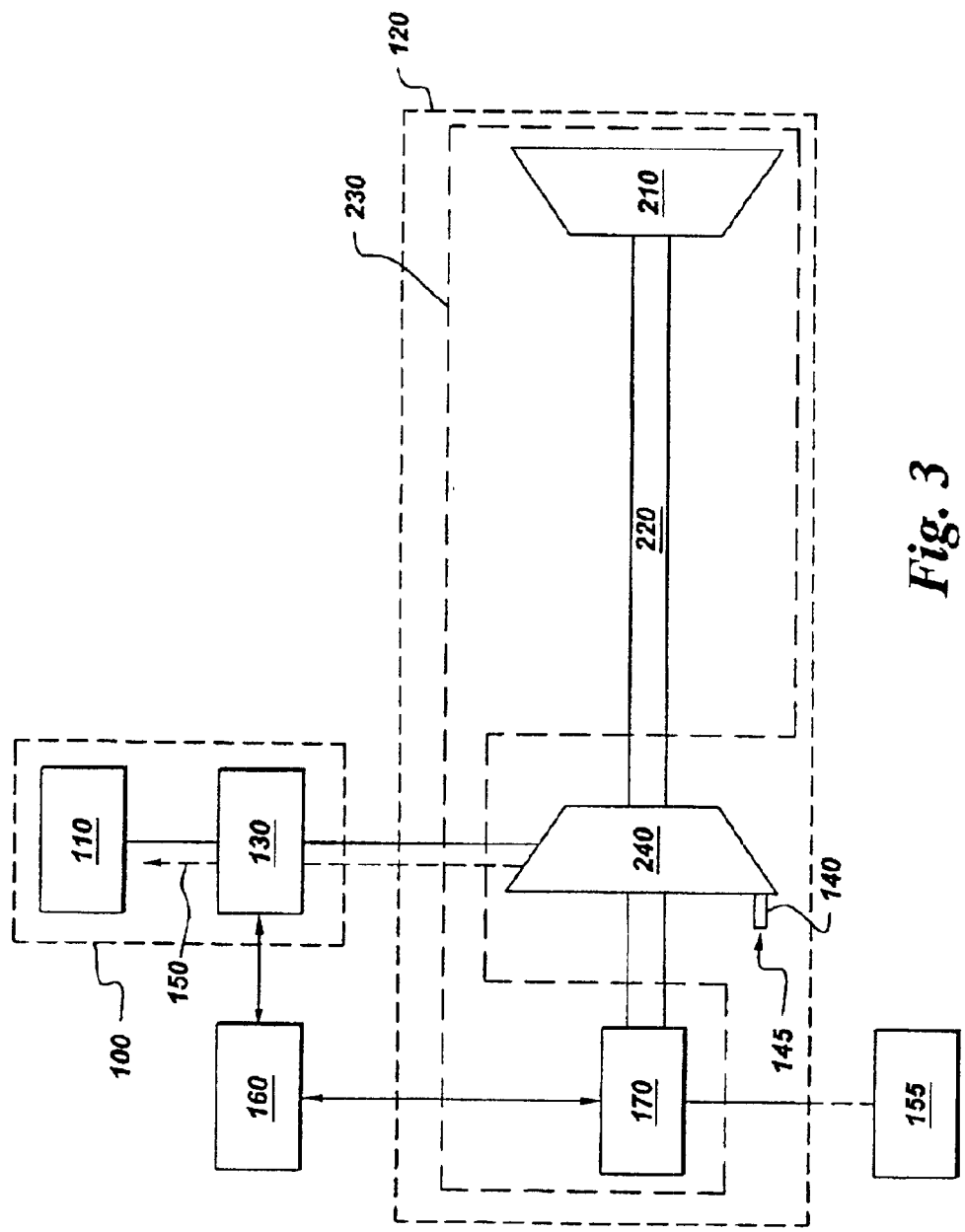
FIG. 3 is a block diagram of an energy management system for a steam turbine in accordance with another embodiment of the present invention.

In another embodiment of the present invention, the energy management system 100 is provided for the steam turbine 230 (see FIG. 3). The steam turbine 230, having a working fluid intake 140, typically comprises the turbine 210 coupled to the turbine generator 170. The steam-generating device 240 is typically coupled to the turbine generator 170 wherein the steam-generating device 240 acts to provide the working fluid 145 in the power-generating device 120. In addition, the steam turbine 230 comprises the dissipation device cooling system 130 coupled to the steam generating device 240 and the electrical dissipation device 110 coupled to an electrical output (not shown) of the turbine generator 170 for receiving a current therefrom. The steam generating device 240 typically comprises boilers, heat recovery steam generators and the like. In this embodiment, the dissipation device cooling system and the electrical dissipation device 110 include the details and operate as described herein.

Figure 4:
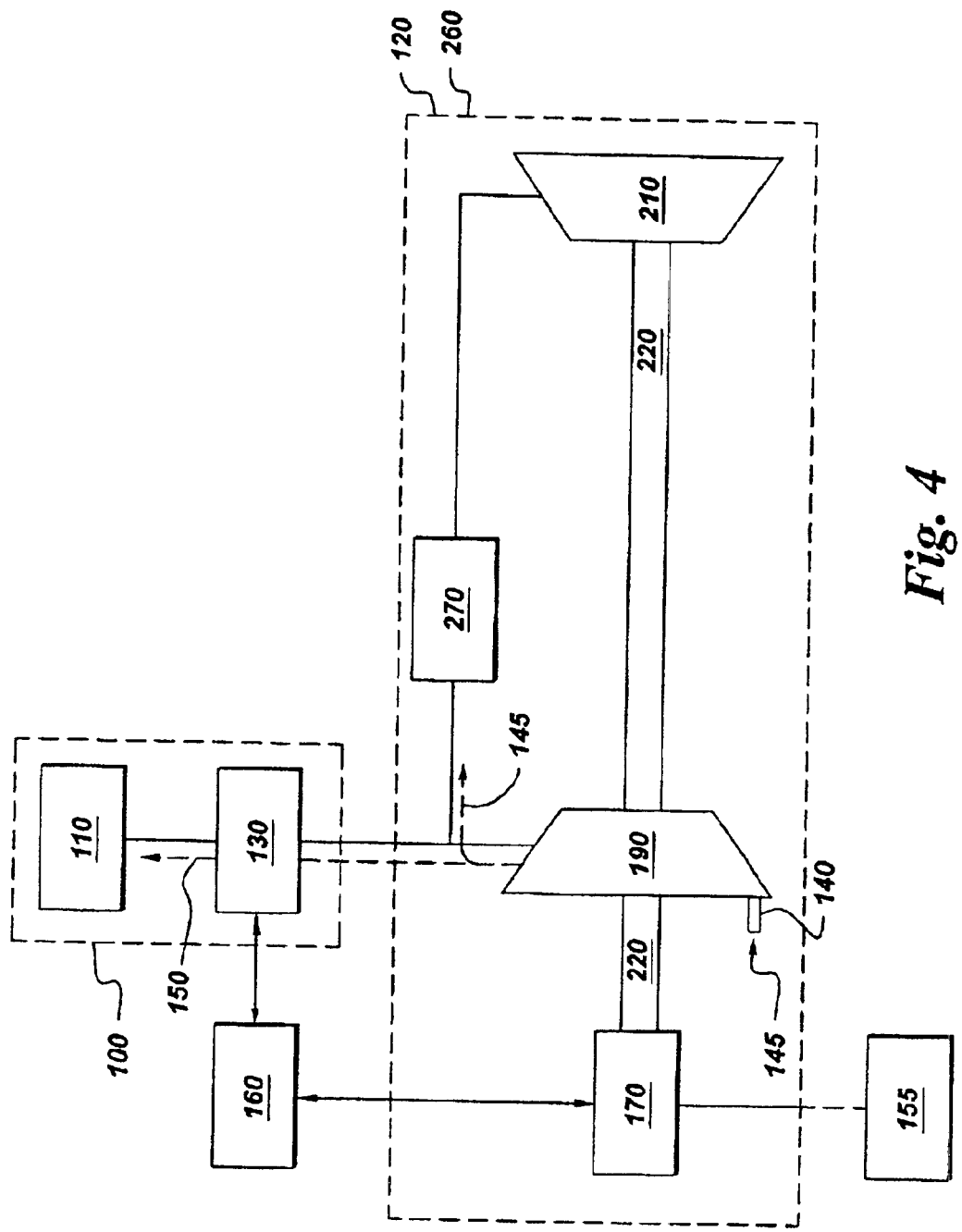
FIG. 4 is a block diagram of an energy management system for a hybrid fuel cell in accordance with another embodiment of the present invention.

In another embodiment of the present invention, the energy management system 100 is provided for the hybrid fuel cell 260 (see FIG. 4). The hybrid fuel cell 260, having a working fluid intake 140, typically comprises the compressor 190 and a fuel cell 270 coupled to the compressor 190. In addition, the hybrid fuel cell 260 comprises the turbine generator 170 coupled to the compressor 190, the dissipation device cooling system 130 coupled to the compressor 190 and the electrical dissipation device 110 coupled to an electrical output (not shown) of the turbine generator 170 for receiving a current therein. In one embodiment, the fuel cell 270 comprises a solid oxide fuel cell. As used herein, the term "hybrid fuel cell" refers to a fuel cell combined with the power generation device 120 (not shown), such as gas turbines (see FIG. 2), steam turbines and microturbines (not shown). In this embodiment, the dissipation device cooling system and the electrical dissipation device 110 include the details and operate as described herein.

In another embodiment, a method of controlling a power generating output is provided and comprises providing the electrical dissipation device 110 and the dissipation device cooling system 130 in a power-generating device 120. The dissipation device cooling system 130 is opened to direct the vented working fluid 150 to the electrical dissipation device 110 so as to provide thermal control to the electrical dissipation device 110. In one embodiment, the dissipation device cooling system 130 is positioned to dispose a fluid flow path of the vented working fluid 150 across the electrical dissipation device 110 when a current flows through the electrical dissipation device 110. In another embodiment, the method of controlling the power generating output further comprises providing the control system 160 coupled to an output of the turbine generator 170 and coupled to the dissipation device cooling system 130. In this embodiment, the control system 160 is configured to determine the load condition in the turbine generator 170 so as to direct the dissipation device cooling system 130 to provide the vented working fluid 150, in response to the load condition, to thermally control the electrical dissipation device 110.

In yet another embodiment, the method of controlling the power generating output further comprises further providing the control system 160 coupled to an output of the turbine shaft 220 and coupled to the dissipation device cooling system 130. In this embodiment, the control system 160 is configured to determine a speed condition in the turbine shaft 220 so as to direct the dissipation device cooling system 130 to provide the vented working fluid 150, In response to the speed condition, to the electrical dissipation device 110 for thermal control of the electrical dissipation device 110.

It will be apparent to those skilled in the art that, while the invention has been illustrated and described herein in accordance with the patent statutes, modification and change may be made in the disclosed embodiments without departing from the true spirit and scoop of the invention. It is, therefore, to be understood that the appended claims are intended to cover all such modifications and changes as fall within the true spirit of the invention.

What is claimed is:

1. An energy management system for a power-generating device coupled to a grid, said power generating device having a working fluid intake, said energy management system comprising:
    an electrical dissipation device coupled to said power-generating device, said power generating device further configured to direct power to said dissipation device in response to a transient condition presented to said power generating device, said transient condition comprising at least one of a transient load condition and a non-load related transient event; and
    a dissipation device cooling system, said dissipation device cooling system configured to direct a portion of said working fluid to said electrical dissipation device so as to provide thermal control to said electrical dissipation device.

2. The energy management system of claim 1, wherein said power-generating device is selected from the group consisting of hybrid fuel cells, steam turbines, microturbines and gas turbines.

3. The energy management system of claim 1, wherein said electrical dissipation device comprises a resistor.

4. The energy management system of claim 1, wherein said dissipation device cooling system comprises a valve.

5. An energy management system for a power-generating device comprising:
    an electrical dissipation device coupled to said power-generating device, said power-generating device comprising a turbine generator;
    a dissipation device cooling system coupled to said electrical dissipation device; and
    a control system coupled to an output of said turbine generator and coupled to said dissipation device cooling system wherein said control system is configured to determine a condition of said turbine generator so as to direct said dissipation device cooling system to provide a portion of a working fluid, in response to said condition, to said electrical dissipation device for thermal control of said electrical dissipation device.

6. The energy management system of claim 5 wherein said dissipation device cooling system comprises a valve, said valve positioned to provide said portion of said working fluid across said electrical dissipation device.

7. The energy management system of claim 5 wherein said condition comprises a load condition.

8. The energy management system of claim 5 wherein said turbine generator is coupled to a turbine shaft.

9. The energy management system of claim 8 wherein said condition comprises a speed condition of said turbine shaft.

10. An energy management system for a gas turbine having a working fluid intake comprising:
    a compressor;
    a combustor coupled to said compressor;
    a turbine generator coupled to said compressor;
    a dissipation device cooling system, said dissipation device cooling system coupled to said compressor; and
    an electrical dissipation device, said electrical dissipation device coupled to an electrical output of said turbine generator for receiving a current therein,
    wherein said dissipation device cooling system is configured to direct a portion of said working fluid to said electrical dissipation device so as to provide thermal control to said electrical dissipation device.

11. The energy management system of claim 10 wherein said dissipation device cooling system comprises a valve.

12. The energy management system of claim 10 further comprising a recuperator.

13. An energy management system for a steam turbine having a working fluid intake comprising:
    a steam-generating device;
    a turbine generator coupled to said steam-generating device, and said turbine generator coupled to a grid;
    a dissipation device cooling system, said dissipation device cooling system coupled to said steam-generating device; and
    an electrical dissipation device, said electrical dissipation device coupled to an electrical output of said turbine generator for receiving a current therein, said turbine generator further configured to direct power to said dissipation device in response to a transient condition presented to said turbine generator, said transient condition comprising at least one of a transient load condition and a non-load related transient event, wherein said dissipation device cooling system is configured to direct a portion of said working fluid to said electrical dissipation device so as to provide thermal control to said electrical dissipation device.

14. The energy management system of claim 13 wherein said dissipation device cooling system comprises a valve.

15. The energy management system of claim 13 wherein said steam-generating device is selected from the group consisting of a boilers and heat recovery steam generators.

16. An energy management system for a hybrid fuel cell having a working fluid intake comprising:

a compressor;

said hybrid fuel cell coupled to said compressor;

a turbine generator coupled to said compressor;

a dissipation device cooling system, said dissipation device cooling system coupled to said compressor; and an electrical dissipation device, said electrical dissipation device coupled to an electrical output of said turbine generator for receiving a current therein, wherein said dissipation device cooling system is configured to direct a portion of said working fluid to said electrical dissipation device so at to provide thermal control to said electrical dissipation device.

17. The energy management system of claim 16 wherein said dissipation device cooling system comprises a valve.

18. The energy management system of claim 16 wherein said hybrid fuel cell comprises a solid oxide fuel cell.

19. A method of controlling a power-generating output of a power generating device comprising:

providing an electrical dissipation device coupled to said power generating device, said power generating device further configured to direct power to said dissipation device in response to a transient condition presented to said power generating device, said transient condition comprising at least one of a transient load condition and a non-load related transient event;

providing a dissipation device cooling system; and opening said dissipation device cooling system to direct a portion of a working fluid to said electrical dissipation device so as to provide thermal control to said electrical dissipation device.

20. The method of claim 19 wherein said dissipation device cooling system is positioned to dispose a fluid flow path across said electrical dissipation device when a current flows through said electrical dissipation device.

21. The method of claim 19 further comprising providing a control system coupled to an output of a turbine generator and coupled to said dissipation device cooling system wherein said control system determines a load condition in said turbine generator so as to direct said dissipation device cooling system to provide a portion of said working fluid to said electrical dissipation device for thermal control of said electrical dissipation device.

22. The method of claim 19 further comprising providing a control system coupled to an output of a turbine shaft and coupled to said dissipation device cooling system wherein said control system determines a speed condition in said turbine shaft so as to direct said dissipation device cooling system to provide a portion of said working fluid said electrical dissipation device for thermal control of said electrical dissipation device.

* * * * *